United States Patent [19]

Pffiffer

[11] 3,998,580

[45] Dec. 21, 1976

[54] PRESS SPAR FOR HEATED PANEL PRESS

[75] Inventor: Heinrich Pffiffer, Eppingen, Germany

[73] Assignee: Maschinenfabrik J. Dieffenbacher & Co., Eppingen, Germany

[22] Filed: July 8, 1974

[21] Appl. No.: 486,375

[30] Foreign Application Priority Data

July 6, 1973 Germany .......................... 2334450

[52] U.S. Cl. ................................................ 425/407

[51] Int. Cl.[2] ........................................... B29C 3/00

[58] Field of Search .......... 425/407, 338, 384, 472; 100/93 P

[56] References Cited

UNITED STATES PATENTS

| | | | |
|---|---|---|---|
| 2,372,114 | 3/1945 | Perry et al. | 425/472 |
| 2,404,165 | 7/1946 | Carver | 425/338 X |
| 3,047,051 | 7/1962 | Matveeff | 100/93.P X |
| 3,545,044 | 12/1970 | Rebovich et al. | 425/DIG. 33 |

*Primary Examiner*—Robert L. Spicer, Jr.
*Assistant Examiner*—R. J. Charvat
*Attorney, Agent, or Firm*—Joseph A. Geiger

[57] ABSTRACT

A press spar construction for heated panel presses producing composite chipboard panels and the like, in which the pressure plates, in order to avoid heat distortion, are insulated from the press spars by means of pressure-resistant, water-repellant insulating blocks of high dimensional stability, which insulating blocks are encased in metallic shrouds so as to avoid friction on the insulating material.

16 Claims, 5 Drawing Figures

4
4
15
3

2
2
4
3
4
4
4
4
8
3
1
7
5
6
6
COOLING
CIRCUIT
MEANS

PRESS SPAR FOR HEATED PANEL PRESS

BACKGROUND OF THE INVENTION

1. Field of the Invention

The present invention relates to devices for the production of composite panels under heat and pressure, and in particular to heated panel presses for the production of chipboard panels, fiber panels, and the like, presses of this type being either single-layer or multi-layer presses and having one stationary press spar and an opposing, movable press spar, with a heated pressure plate on each spar.

2. Description of the Prior Art

Heated panel presses of the above-mentioned type are notorious for their problems encountered with respect to the maintenance of the necessary plane-parallelism of the heated pressure plates during repeating pressing operation, as the pressure plates are alternatively heated and cooled.

These problems are related to the fact that the pressure plates, which are rather large in surface, are heated to considerable temperatures and that the uneven heat distribution within the structure of each press spar leads to thermal stress and subsequent distortions, with the result that the initial geometric flatness of the pressure plates is destroyed.

Various approaches have been suggested in the past for a correction of this problem, one such proposal being that the supporting structure of the press spars should be heated, too. Another approach suggests tha the spars should be cooled and that a heat barrier between the pressure plates and the press spar should be installed, in order to prevent any heat transmission.

Known prior art panel presses featuring such heat barriers have either a cooling grid and a cooling plate, or an insulating layer, against which the pressure plates are supported. However, the many machined surfaces necessary in such a structure, coupled with the corrosion encountered on these surfaces and with the effect of cumulative tolerances, to which must be added a comparatively rapid partial wear of the insulating layers, leads to the result that, even with a pressure plate machined to perfect flatness, no satisfactory pressing performance, under maintenance of the necessary plane-parallelism over a substantial length of time, is obtainable. The basic construction of such a press is disclosed, for example, in U.S. Pat. No. 3,594,867. Upper and lower press spars with insulated pressure plates are shown in U.S. Pat. No. 3,685,932 and 3,775,033.

Part of the reasons for the above problem relate to the tendency of the insulating layers to absorb humidity, thereby swelling and contracting, which adds to the simultaneous expansion and contraction caused by changes in temperature, thereby producing a friction effect between the pressure plates and the insulating layer, so that the latter is subjected to rapid abrasion and premature destruction. Furthermore, the compressibility of the insulating layers under pressure was found to change, as a result of the absorption of humidity by these layers.

A further shortcoming of the known prior art insulating layers for these pressure plates relates to their lack of dimensional stability, because of their inadequate long-term resistance to elevated temperatures, and to their inadequate compression resistance. The end result of such uneven wear and dimensional distortion of the insulating plates is that their thickness is unevenly affected and that the working surface of the pressure plates consequently are distorted so as to loose their required flatness. The resulting work product is a composite pressed panel of uneven thickness, necessitating either reworking of the panel, or even complete rejection and loss of the end product.

Prior art solutions using the approach of compensatory heating or cooling of the entire press spar structure have the shortcoming that such a structure becomes rather complex and costly, necessitating complicated temperature control devices. A further shortcoming relates to the fact that considerable time is necessary for the initial heating of such a structure, until a state is reached in which all parts of the press spar are evenly heated.

SUMMARY OF THE INVENTION

It is a primary objective of the present invention to overcome the above-mentioned shortcomings and to suggest an improved press spar structure for heated panel presses in which insulating means for a thermal barrier are provided which have good dimensional stability, so as to assure plane-parallel compression of the work, while reducing the energy consumption to a minimum.

The present invention proposes to attain the above objective by suggesting that between the heated pressure plates and the oppositely spaced end faces of the uprights be arranged several insulating blocks of high pressure resistance, low heat conductivity, and little or no humidity absorption the insulating blocks being confined between upper and lower metallic shrouds.

This novel structure has the advantage that the heat flow from the pressure plates to the supporting structure of the press spars is substantially blocked, so that no thermal stress is created in the spar structure itself. Any relative motion created between the pressure plates and the press spars during a pressing operation, which motion is to some degree unavoidable due to temperature changes in the pressure plates, now no longer causes friction and wear on the insulating blocks themselves, because that friction is now sustained at the surfaces of the metallic shrouds of the insulating blocks, on the one hand, and the pressure plates or the uprights of the spars, on the other hand. Furthermore, dimensional variations of the insulating blocks caused by pressure and heat, due to humidity absorption, are eliminated, because the suggested insulating materials used are hydrophobic, i.e. they do not absorb any humidity.

In those cases where heated panel presses operate at very high pressing temperatures, and where a risk exists that the press spar structure opposite the insulating blocks nevertheless is heated more than can be tolerated, the invention further suggests that the uprights of the press spar structure, or the bottom plate, if one is used, be provided with one or more cooling channels extending therethrough and that a suitable cooling fluid be circulated through these channels.

Where such a cooling system is necessary, the invention further suggests that the rate at which the cooling fluid is circulated, and/or its temperature, be made adjustable, and that appropriate circulation control means, responsive to temperature sensors arranged in the press spar structure opposite the heated pressure plates, be provided. Such an arrangement precludes any undesirable heat buildup in the press spar structure, through heat transmission from the pressure plates, the press spars themselves being preferably maintained at a temperature which is close to the ambient temperature. Examples of suitable channel systems for cooling purposes are given in U.S. Pat. No. 3,594,867.

The basic solution proposed by the present invention is advantageously also applicable to heated panel presses which have heatable and coolable pressure plates connected to the appropriate press spars via insulating plates which extend over substantially the entire surface of the press spar. This solution consists primarily in arranging an insulating bank consisting of a plurality of insulating blocks of high quality materials, so as to form a frame-like assembly around the entire outline of the pressure plate, and including transverse web portions, each insulating block being confined between upper and lower metallic shrouds, and the remaining areas between the transverse web portions being filled with either insulating pads or loose insulating material of lesser quality.

In this context, it should be understood that insulating blocks of high quality are meant to comprise insulating blocks of a material having high pressure resistance, low heat conductivity, and a minimal water absorption tendency. Such materials are, for example, mica compositions, ceramics, glass, natural stone, synthetic stone, and asbestos. Insulating pads of lesser quality, on the other hand, may be made of a material of lesser pressure resistance, higher conductivity, and higher humidity absorption. Such materials are, for example, glass wool, stone wool, asbestos panels, and the like. These insulating pads are not subjected to compression, like the insulating blocks, and the heat barrier may therefore in part be provided by an air space.

In a preferred embodiment of the invention, the transverse web portions formed by insulating blocks are arranged in those zones of the pressure plate which are subjected to the highest pressures.

Another advantageous feature of the present invention suggests that the insulating blocks be coated on all sides with either a plastic material or a metal skin, thereby making the insulating blocks impervious to the ambient humidity. This improvement eliminates any danger of dimensional distortions and consequent frictional displacement due to absorption of humidity. A plastic material suitable of this purpose is, for example, polytetrafluor ethylene, which has the additional advantage that it produces an extremely smooth surface having a low coefficient of friction. Thus, no wear will occur, even in the case when some friction takes place between the coated insulating blocks and their metallic shrouds. If a metallic skin is to be applied to the insulating blocks, such materials as steel, bronze, or similar metals, may be spray-coated onto the insulating blocks. The outer surfaces of the metallic shrouds are preferably likewise coated in this manner.

The invention further suggests an embodiment in which the contact surfaces between the insulating blocks and the metallic shrouds, on the one hand, and between the outer surfaces of the metallic shrouds and the surfaces against which the latter are pressed, on the other hand, are treated to have different coefficients of friction, in order for any frictional displacement to always take place on the outer surfaces of the metallic shrouds. This means that the metallic shroud has a high coefficient of friction on its inside and a low coefficient of friction on its outside.

When the pressure plates are first machined and then mounted to the press spars, there might still result a certain deviation from the desired geometrically flat pressure surface on the pressure plate. The use of insulating blocks with metallic shrouds, however, now offers the advantageous possibility of conveniently compensating for deviations resulting from manufacturing tolerances. This is accomplished by simply inserting under the metallic shrouds shimming sheets of appropriate gauge. Even several shimming sheets may be positioned between an insulating block and its shrouds, whereby the upstanding edges of the shrouds conveniently position the shimming sheets. Obviously, therefore, this convenient method of shimming the pressure plate over virtually its entire surface, at increments of one-tenth of a millimeter, or less, makes it possible to adjust the pressure plates of a panel press for true plane-parallelism.

As mentioned, suggested materials from which the insulating blocks of the invention may be manufactured are mica compositions, glass, or ceramics. Likewise suitable materials are natural stone, synthetic stone, and asbestos, if the latter are made impervious to water, and preferably even to steam, by impregnation or surface coating. The physical characteristics of these materials fall within the following ranges:

Heat conductivity: 0.65 to 2.2 KCal/meter h ° C
Compression resistance: 1000 to 8500 kg/cm$^2$
Water absorption: 0.00
Long-term heat resistance: 400° C to 500° C The major achievement of the present invention is an assurance that the plane-parallelism of the pressure plates, once precisely adjusted, is maintained even under the most unfavorable operating conditions, because a heat barrier of great dimensional stability is provided.

Additional advantages of the present invention relate to the fact that this heat barrier not only reduces the overall energy requirements during operation of the panel press, but also greatly shortens the warmup time required, by eliminating the previously necessary waiting time for the entire spar structure to reach an even temperature.

By using the aforementioned expensive, high quality insulating materials in the form of insulating blocks arranged only at the places of pressure transmission to the pressure plates, while using less expensive, common insulating materials for the major surfaces between the insulating blocks, the overall manufacturing costs of the novel structure are held low, in spite of the advantages gained.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows.

DESCRIPTION OF THE PREFERRED Embodiments

Figures 1, 2:
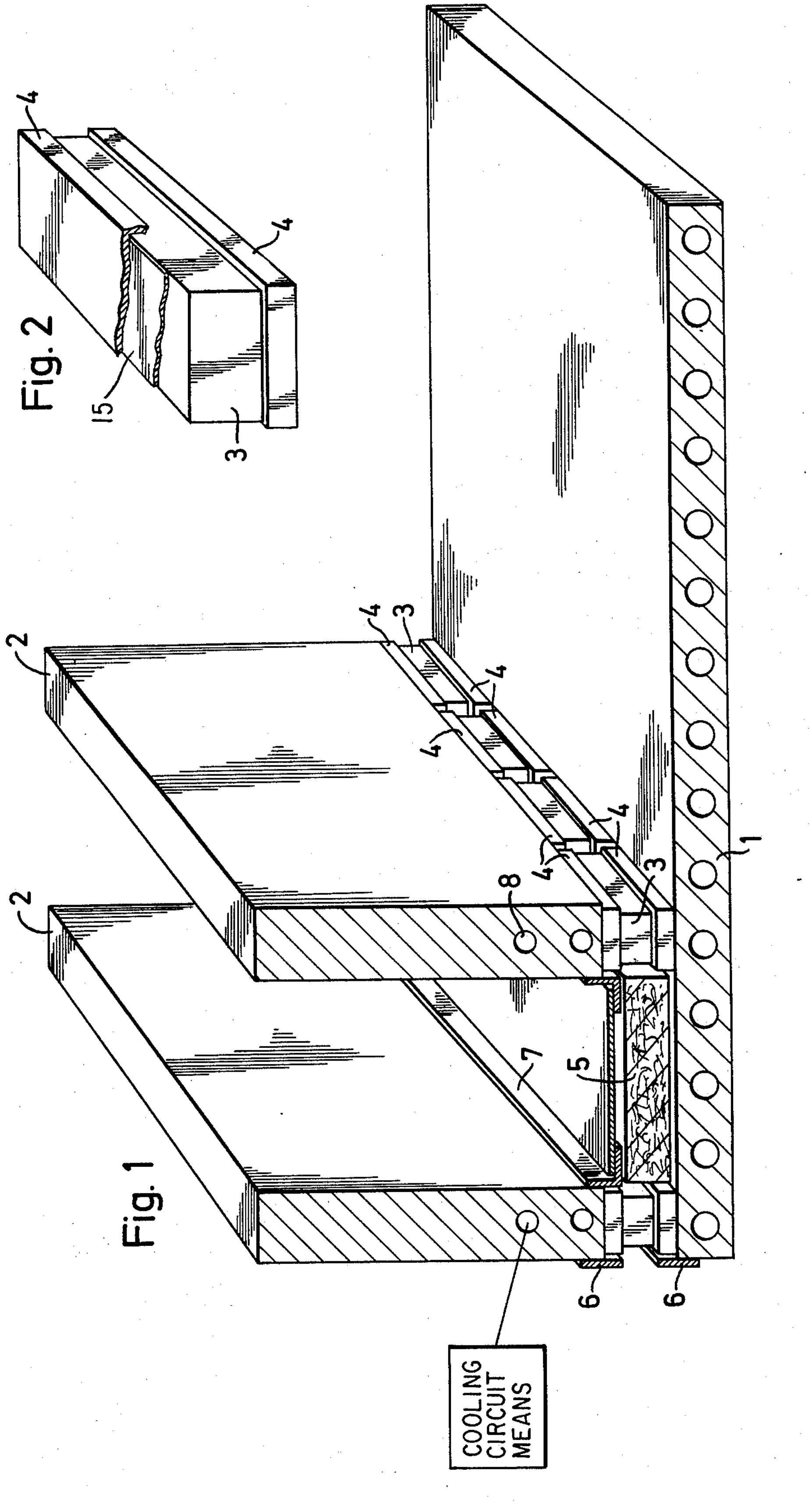
FIG. 1 is a perspective representation of the major component parts of an upper press spar for a heated panel press embodying the invention.
FIG. 2 is an enlarged perspective view of an insulating block with metallic shrouds, as part of the embodiment of FIG. 1.
Figure 5:
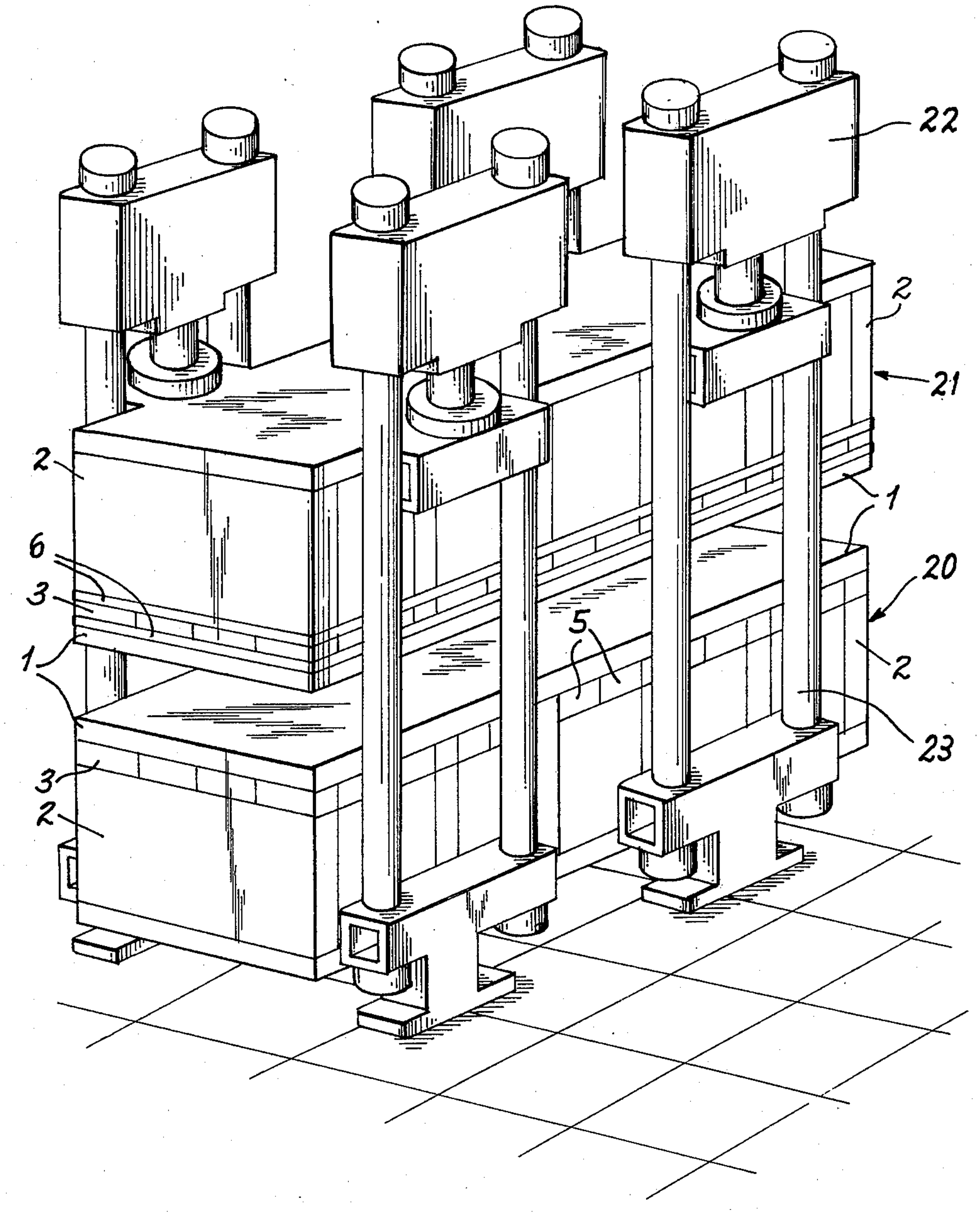
FIG. 5 shows a schematic perspective representation of a heated panel press.

In FIG. 1 is illustrated a portion of an upper press spar of a heated panel press for the production of hot-pressed composite panels, such as chipboard panels, fiber panels, etc. A similarly constructed lower press spar cooperates with the one illustrated in FIG. 1. The two press spars carry opposing horizontal pressure plates as can be seen in FIG. 5, the pressure plate 1 of each press spar being supported by several longitudinally spaced uprights 2. For a disclosure of constructional details of such a press spar, see U.S. Pat. Nos. 3,594,867, 3,685,932 and 3,775,033.

As FIG. 5 indicates schematically, both press spars are generally box-shaped rigid structures, the lower spar 20 being solidary with the press foundation, while the upper spar 21 is vertically movable, being carried by four or more hydraulic pressure cylinders 22 which are mounted on the upper end of rigid supporting columns 23. The cylinders 22 provide the pressure with which the panel raw materials, after being placed between the heated pressure plates 1, are compressed and cured.

The pressure plate 1 carries several insulating blocks 3 positioned in alignment with the lower end faces of the uprights 2 to which the pressure plate 1 is loosely attached. As can best be seen in FIG. 2, each insulating block 3 is enclosed between upper and lower metallic shrouds 4. The insulating blocks 3 are retained in position by means of end battens 6 and angle irons 7. Between the several rows of insulating blocks 3 are further arranged larger insulating pads 5, serving as a heat barrier against the radiation of heat from the hot pressure plate 1. These insulating pads 5 are made of inexpensive insulating material such as glass wool, stone wool, or the like.

Heated panel presses which are to operate at temperatures of 300° C and above are preferably also provided with one or several transverse cooling channels 8 arranged in the uprights 2, through which a cooling medium from a cooling system (not shown) can be circulated, in order to prevent any heat buildup which may take place in the uprights, in spite of the insulating blocks 3. A suitable cooling system is disclosed in U.S. Pat. No. 3,775,033.

Figure 3:
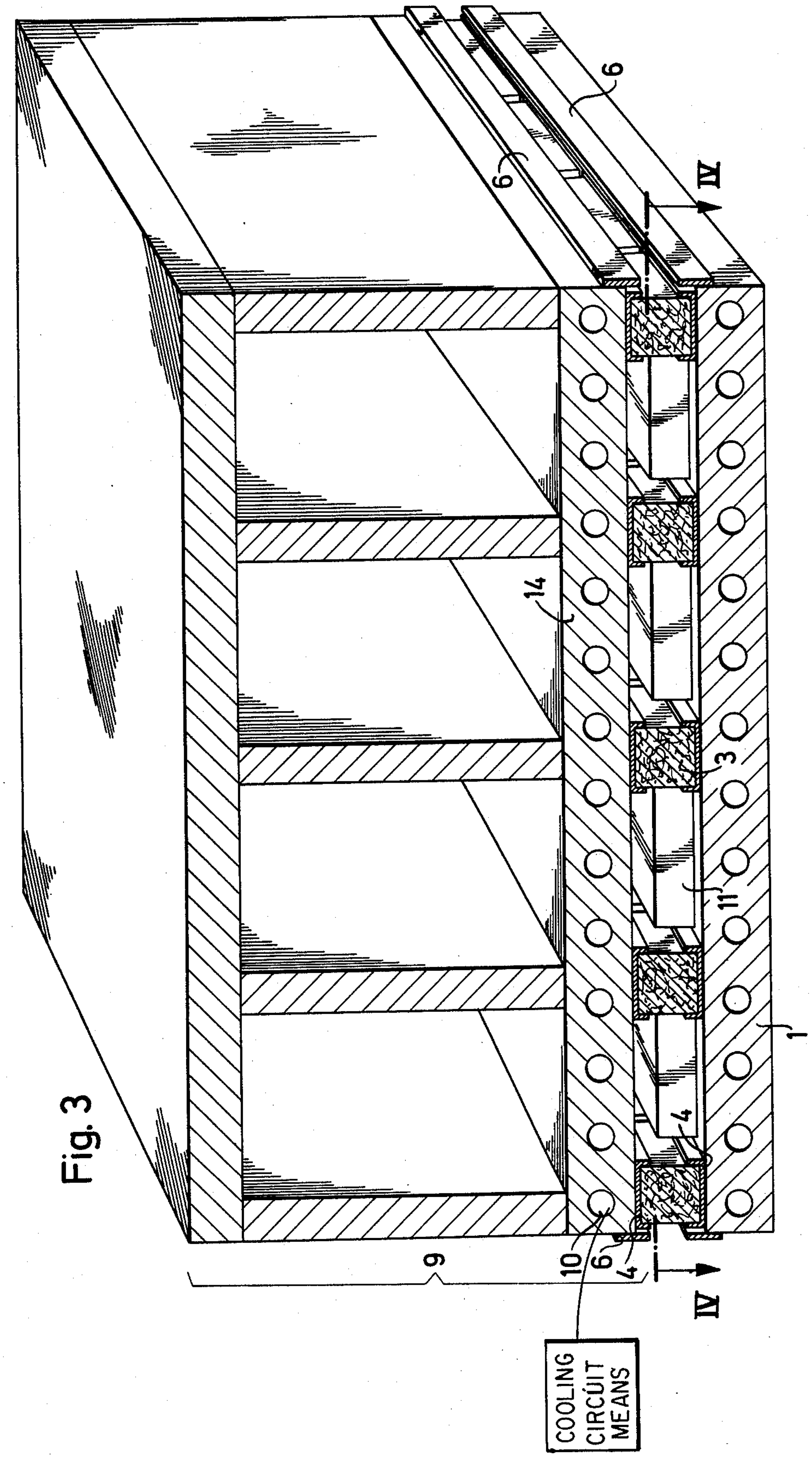
FIG. 3 is a perspective representation of a second embodiment of the invention, with insulating elements covering the entire surface of the pressure plate.
Figure 4:
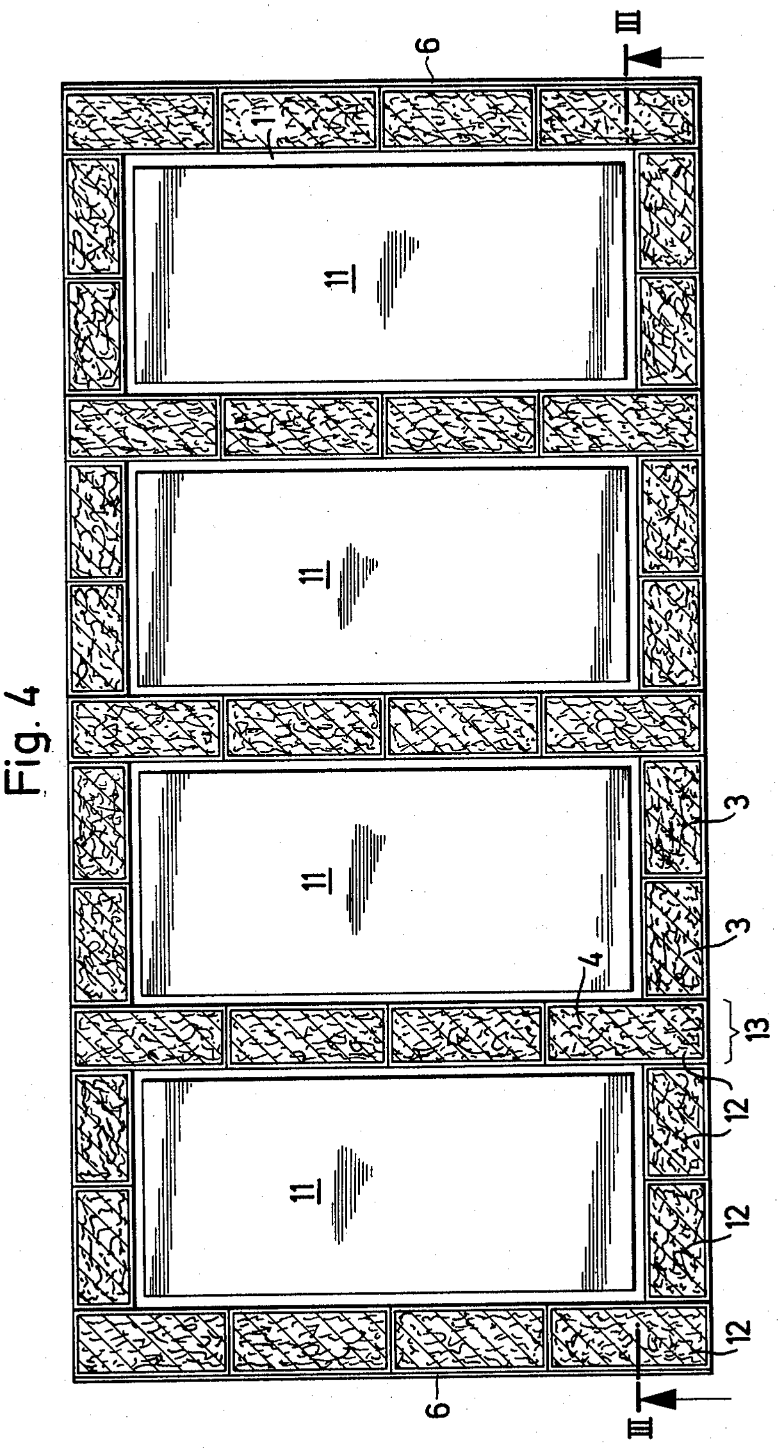
FIG. 4 shows in a plan view the arrangement of the insulation blocks and insulation pads of FIG. 3.

In FIGS. 3 and 4 is illustrated a second embodiment of an upper press spar carrying a pressure plate 1. The cooperating lower press spar has a similar, but vertically inverted structure (see FIG. 5). In this case, however, the press spar structure includes a bottom plate 14, and the entire surface between the hot pressure plate 1 and the bottom plate of the press spar is covered by an insulation structure. This structure is best seen in FIG. 4, and it consists of an insulating frame 12 whose outline corresponds to that of the pressure plate, with several transverse web portions 13 positioned in alignment with the uprights of the press spar structure.

The insulating frame 12 and its transverse web portions 13 are composed of a series of insulating blocks 3 of the kind shown in FIG. 2, each block having again an upper and lower metallic shroud 4. Into the spaces between the frame 12 and the web portions 14 are fitted special insulating pads 11. However, because the pads 11 are not subjected to pressure, they may be manufactured of an insulating material of lesser quality, such as stone wool, glass wool, or asbestos cement, while the insulating blocks 3 of the insulating frame 12 and transverse web portions 13 are made of the earlier-described high quality, pressure-resistant insulating materials.

As in the other embodiment, cooling means may again be provided in the press spar, if necessary. In this case, the bottom plate 14 lends itself conveniently for the purpose, if cooling channels 10, as schematically shown in FIG. 3, are provided therein. Again, the cooling system itself is known and is not shown, for the sake of clarity of the drawing.

Any deviations of the exposed working surface of the pressure plate 1 from a true plane can be conveniently compensated for by the interposition of one or more shimming sheets 15 between the insulating blocks 3 and their top or bottom shrouds 4 (FIG. 2).

It should be understood, of course, that the foregoing disclosure describes only preferred embodiments of the invention and that it is intended to cover all changes and modifications of these examples of the invention which fall within the scope of the appended claims.

I claim:

1. In a heated panel press for the production of pressed, composite panels such as chipboard panels, fiber panels and the like, in which the work is pressed between opposing, heatable and coolable horizontal pressure plates which are mounted on upper and lower press spars, respectively, of which at least one is vertically movable, wherein the improvement pertains to the structure of the press spars and comprises:
   - at least two upright press spar members to which the associated horizontal pressure plates are connected;
   - a heat barrier in the form of a pressure-resistant insulating bank interposed between the back surface of the pressure plate and the pressure-transmitting near end face of each upright members;
   - upper and lower metallic shroud members encasing each insulating bank in such a way that such relative horizontal displacements between the upright members and the pressure plate as are generated by non-uniform thermal expansion of the press spar structure elements during operation take place between the upright members and the contacting shroud members, on the one hand, and between the pressure plate and the shroud members in contact with the pressure plate, on the other hand.

2. A press spar structure as defined in claim 1, wherein:
   - each insulating bank includes a plurality of adjacently positioned insulating blocks;
   - the metallic shroud members ae separate upper and lower shrouds encasing each insulating block; and
   - the insulating blocks are of a material selected for high pressure resistance, low heat conductivity, and minimal humidity absorption.

3. A press spar structure as defined in claim 2, wherein
   - the insulating blocks are of a material selected from the group consisting of mica compositions, glass and ceramics.

4. A press spar structure as defined in claim 2, wherein:
   - the insulating blocks are of a material selected from the group consisting of natural stone, synthetic stone, and asbestos; and the insulating blocks are treated so as to be impervious to humidity and steam.

5. A press spar structure as defined in claim 2, wherein the insulating blocks include a surface coating on at least their pressure-transmitting top and bottom surfaces.

6. A press spar structure as defined in claim 5, wherein:

the shrouds, too, include a surface coating on at least their outer surfaces; and the coefficient of friction obtaining under pressure between the insulating block and the inner face of the shroud is considerably higher than the coefficient of friction obtaining between the outer face of the shroud and the cooperating member of the press spar structure.

7. A press spar structure as defined in claim 5, wherein the surface coating of the insulating blocks is a heat-resistant synthetic plastic material.

8. A press spar structure as defined in claim 7, wherein the material of the surface coating of the insulating blocks is polytetrafluor ethylene.

9. A press spar structure as defined in claim 5, wherein the surface coating of the insulating blocks is a metallic skin.

10. A press spar structure as defined in claim 1, further comprising means for cooling those portions of the press spar structure which are proximate to the insulating frame.

11. A press spar structure as defined in claim 10, wherein the cooling means includes cooling channels arranged in the press spar structure adjacent the insulating frame, means for circulating a cooling medium therethrough, and means for thermostatically adjusting the rate of cooling so as to maintain an even temperature in the press spar structure, in spite of varying heat levels in the pressure plate.

12. A press spar structure as defined in claim 1, further comprising shimming sheets interposed between the insulating banks and the shroud members encasing the latter, for the compensation of any deviations from plane-parallelism between opposing press spars in a panel press.

13. A press spar structure as defined in claim 12, wherein:

each insulating bank includes a plurality of adjacently positioned rectangular insulating blocks;

the metallic shrouds are separate upper and lower shrouds encasing each insulating block with a matching rectangular bottom portion and four upstanding sides; and the shimming sheets are sized to fit between the insulating block and one of the shrouds, being laterally confined between its upstanding sides.

14. A press spar structure as defined in claim 2, further comprising:

a bottom plate of a size comparable to that of the pressure plate, arranged contiguously with the near ends of the upright members, between the latter and the insulating banks; and wherein the insulating banks together define a flat insulating frame having an outline similar to that of the pressure plate and including at least one transverse web portion; and the insulating frame further includes insulating pads arranged in the space between its transverse web portion or portions and the peripheral portions of the frame.

15. A press spar structure as defined in claim 14, wherein:

the bottom plate is attached to the end faces of the upright members;

the upright members are several longitudinally spaced uprights having a transverse length substantially equal to the width of the pressure plate; and the transverse web portions of the insulating frame are arranged in vertical alignment with the longitudinal positions of the uprights.

16. A press spar structure as defined in claim 14, wherein:

the bottom plate includes cooling channels extending therethrough; and the press spar structure further comprises means for circulating a cooling medium through said cooling channels.

* * * * *